United States Patent [19]

Sawai

[11] 3,760,111

[45] Sept. 18, 1973

[54] PULSE REGENERATIVE REPEATER FOR A MULTILEVEL PULSE COMMUNICATION SYSTEM

[75] Inventor: Akira Sawai, Tokyo, Japan

[73] Assignee: Nippon Electric Company, Limited, Tokyo, Japan

[22] Filed: June 14, 1971

[21] Appl. No.: 152,942

[30] Foreign Application Priority Data

June 20, 1970 Japan .......... 45/53614

[52] U.S. Cl. .......... 179/16 E, 178/70 R, 328/164

[51] Int. Cl. .......... H04b 3/04, H04b 3/36

[58] Field of Search .......... 179/15 AD, 16 E, 179/16 EA; 178/70 R, 70 T, 70 TS; 328/164; 307/268, 269; 333/18 R, 28 R

[56] References Cited

UNITED STATES PATENTS

| | | | |
|---|---|---|---|
| 2,996,578 | 8/1961 | Andrews, Jr. | 178/70 TS |
| 3,544,912 | 12/1970 | Zegers et al. | 328/164 |
| 3,437,760 | 4/1969 | Kawashima et al. | 179/15 AD |
| 3,261,986 | 7/1966 | Kawashima et al. | 179/15 AD |
| 2,992,341 | 7/1961 | Andrews, Jr. et al. | 179/15 AD |

*Primary Examiner*—Kathleen H. Claffy
*Assistant Examiner*—Randall P. Myers
*Attorney*—Richard C. Sughrue et al.

[57] ABSTRACT

Disclosed herein is a pulse regeneration repeater system which includes means for extracting from a train of multi-level code pulses the clock signal defining the bit interval. Received code pulses, prior to entering a clock signal extracting circuit, pass through a distortion compensating equalizing circuit. The equalizing circuit modifies the pulses in the code pulse train to produce output pulses having a half-level width T′ less than the clock period T, but greater than one-half of the clock period in response to code signals which, prior to transmission distortion, have a half-level width of T/2.

2 Claims, 14 Drawing Figures

FREQUENCY RESPONSES FOR PULSES WITH WIDTH T AND T'

CHART FOR CALCULATING REQUIRED FREQUENCY CHARACTERISTICS OF THE EQUALIZING CIRCUITS

INVENTOR
AKIRA SAWAI

BY Sughrue, Rothwell, Mion, Zinn & Macpeak
ATTORNEYS

PULSE REGENERATIVE REPEATER FOR A MULTILEVEL PULSE COMMUNICATION SYSTEM

This invention relates to a pulse regenerative repeater system for a multilevel pulse communication system and, more particularly, to a pulse regenerative repeater for extracting timing signals from a received multilevel code pulse train having a plurality of code levels.

It is well known that the short distance PCM repeater system is in practical use for the transmission of code trains, as described in the article entitled "A Bipolar Repeater for Pulse Code Modulation Signals" by J.S. Mayo (Bell System Technical Journal, pp. 25 ~ 97, vol. 41, January, 1962), and that since the coding system adopted in such a short distance PCM system is in the form of bipolar pulse trains assuming three levels (+1, 0, −1), there is very little occurrence possibility of successive codes "1" or "−1." For other three-level transmission systems, however, such possibility is not always eliminated.

In contrast, for a long distance ultra-multiplex PCM system employing coaxial cables as the transmission medium, a multilevel communication system employing four, five or more of code levels has been proposed in order to utilize the coaxial cables as effectively as possible. This system is disclosed in detail in the paper entitled "Information Rate of a Coaxial Cable with Various Modulation Systems" by J.R. Pierce (Bell System Technical Journal, vol. 45, pp. 1197 ~ 1207, Oct. 1966). For a general multilevel more than two level communication system, there is some occurrence possibility of successions of equal code levels or of codes of the same polarity. In consequence, the mere application of the timing signal extracting method adopted in the short distance PCM repeating system which is the combination of 100 percent equalization and folding extraction (the so-called self-extracting method) causes insufficient extraction of the timing signal in case of a succession of equal code levels or of codes of the same polarity.

It is therefore an object of this invention to provide a pulse regenerative repeater which secures sufficient self-timing for multilevel pulse communication systems of various types.

Figure 2:
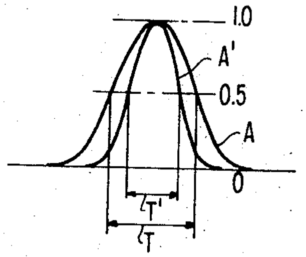
FIG. 2 shows waveforms for explaining the principle of the operation of this invention.
Figure 6A:
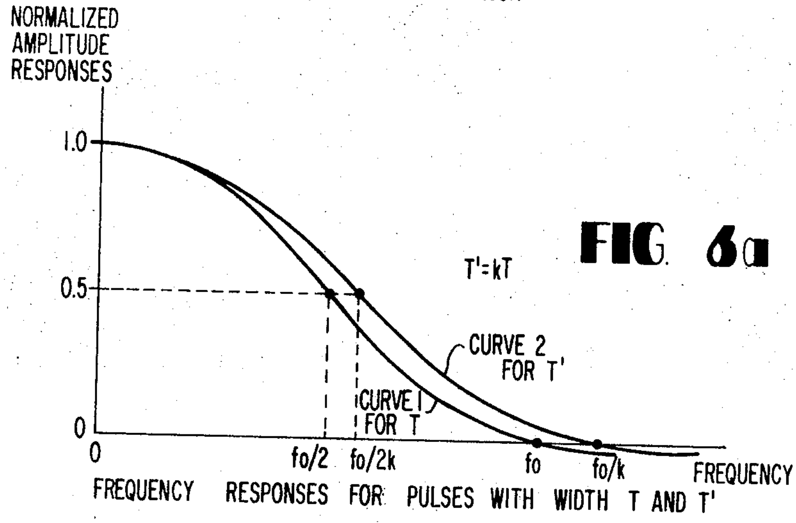
Figures 6B, 7:
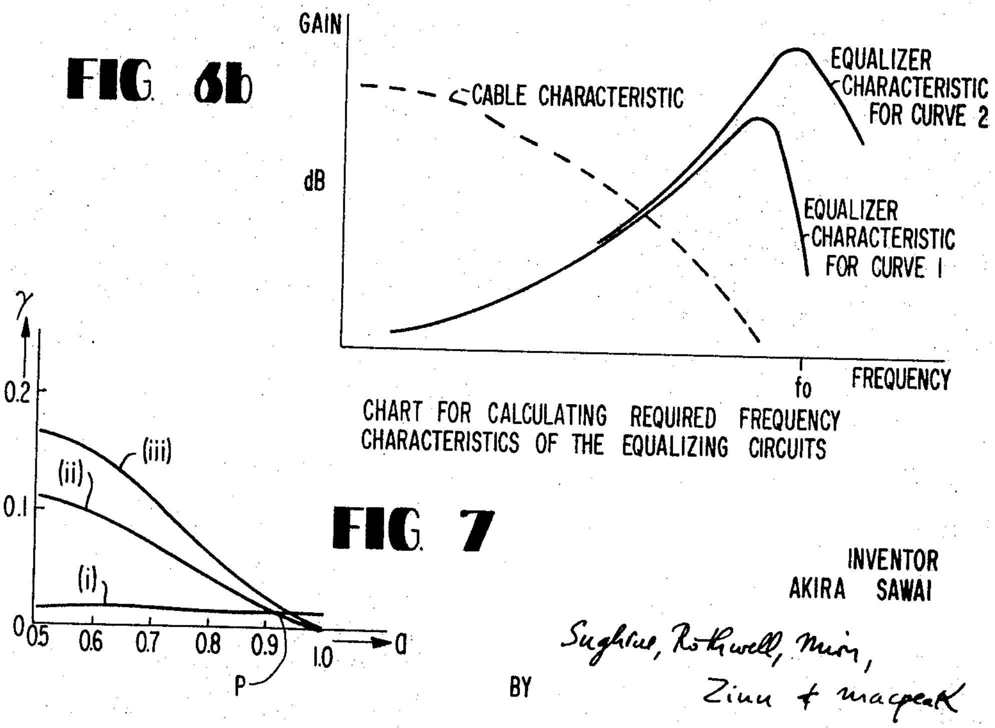
Figure 4:
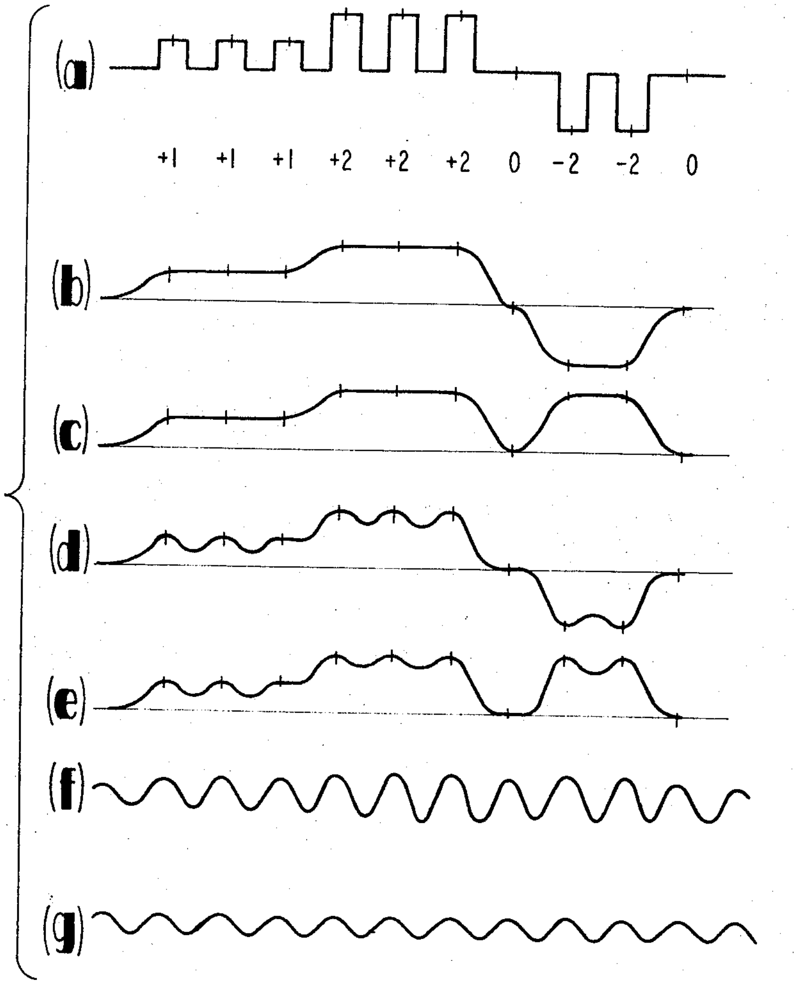

FIGS. 4(*a*) through (*g*) are waveform charts for explaining the principles of operation of the invention in contrast with that of a conventional system;

FIGS. 6(*a*) and 6(*b*) show curves for calculating required frequency characteristics of equalizing circuits with respect to the wave forms of FIG. 2;

FIG. 7 is a graph depicting the timing pulse extracting characteristics of the circuits of this invention.

Figure 1:
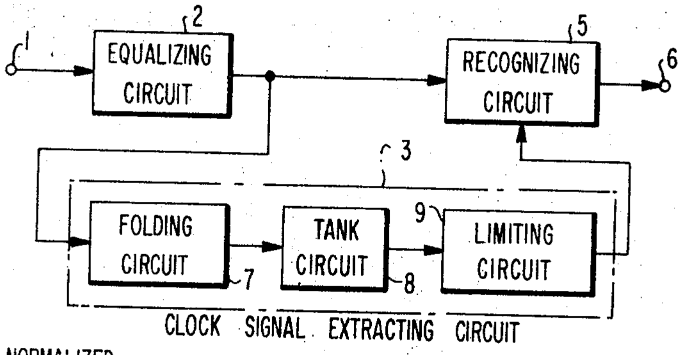
FIG. 1 PRIOR ART
FIG. 1 is a block diagram of a conventional pulse regenerative repeater.

Referring to FIG. 1, transmitted pulses received at an input terminal 1 usually suffer waveform distortions due to the transmission line. In order to remove such distortions an equalizing circuit 2 is provided so as to minimize recognition or detection error in a recognizing circuit 5 receiving the output of the equalizing circuit 2.

In FIG. 2, curve A illustrates the output waveform of the equalizer 2 in response to an isolated square-shaped pulse whose width is one-half clock period T of the input pulse train. In order to minimize the recognition error, the half-amplitude width of the equalized output is chosen equal to a clock period T. Such equalization is well known as 100 percent equalization.

In the repeater for the above-mentioned short distance PCM system, the clock signal is derived through folding extraction by means of a clock signal extracting circuit 3 of FIG. 1 from the equalized code pulse train which is the output of the equalizing circuit 2.

The clock signal extracting circuit 3 comprises a folding circuit 7 such as a rectifier, a tank circuit 8 for extracting the clock frequency component and a limiting circuit 9 for suppressing the level deviation of the output of the tank circuit. No trouble occurs with this system so long as the bipolar coding method is employed, as described above, but some troubles occur if this system is applied directly to general multilevel code pulse trains.

For example, when a code pulse train shown in FIG. 4(*a*) is transmitted through a transmission line, the received pulse train usually suffers some distortions. This distorted code pulse train is fed to the equalizing circuit 2 in FIG. 1, to obtain the equalized signal such as shown in FIG. 4(*b*). This signal is then folded so that the negative portions thereof are converted to a positive portion whose values are equal to the absolute values of the negative portions. This results in the signal shown in FIG. 4(*c*). As is seen from FIG. 4(*c*), when the equalizing circuit 2 operates on 100 percent equalization as shown by curve A in FIG. 2, it is almost impossible to extract the clock frequency component from this signal.

Figure 3:
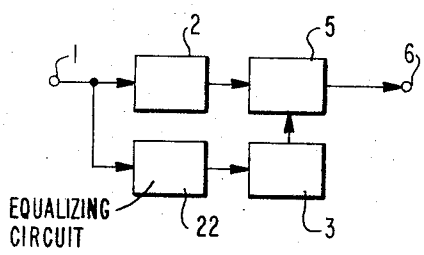
FIG. 3 and FIG. 5 are block diagrams showing the embodiments of this invention.

A feature of this invention lies in the employment of the equalization to make timing signal extraction easier. More specifically, the equalization considering the clock signal extraction is characterized in that it is so arranged that the half-level width T′ of its output signal is narrower than a clock period T, as is shown by curve A′ in FIG. 2. To this end it is generally required that the equalization bandwidth of the equalizing means should be wider than that for the 100 percent equalization. The embodiments of this invention will now be described with reference to FIGS. 3 to 5. In FIG. 3, the circuit constituents identical to those in FIG. 1 are designated by like reference numerals. The input signal applied to the input terminal 1 is applied in parallel to a complementary equalizing circuit 22 operating on the equalizing degree smaller than 100 percent and the equalizing circuit 2 operating on 100 percent equalization. The output from the equalizing circuit 22 is folded and timing-extracted by the timing circuit 3 which produces clock signals of uniform amplitude to be applied to the recognizing circuit 5. At the output of the equalizing circuit 22, the signal shown in FIG. 4(*d*) is obtained in response to the transmitted code pulse train of FIG. 4(*a*) which contains considerably long successions of equal code levels and/or of codes of the same polarity. The waveform of FIG. 4(*d*), however, differs from that of FIG. 4(*b*) in that the former retains the clock frequency component even in case of a succession of either equal code levels or codes of the same polarity. The equalized output of FIG. 4(*d*) is folded by the folding circuit 7 to assume the waveform of FIG. 4(*e*). The tank circuit 8 extracts the clock frequency component from this signal shown in FIG. 4(*e*) to obtain the clock component signal which has usually amplitude deviations, as is shown in FIG. 4(*f*). Through the limiter circuit 9 the amplitude of this clock component signal is limited to a particular level, giving finally the clock component signal of uniform amplitude, as shown in FIG. 4(*g*). In this case, the equalization bandwidth of the equalizing circuit 24 is narrower than that of the equalizing circuit 22 which is arranged to be proper to the clock signal extraction. Therefore, it is possible to use a common equalizing circuit which shares a common part of the two equalization characteristics.

Figure 5:
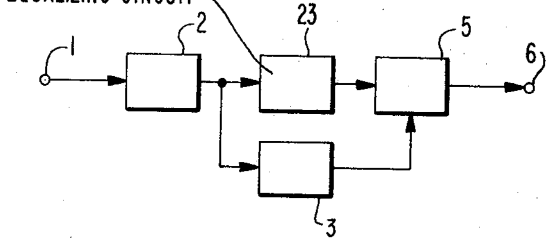

This leads to the arrangement of FIG. 5 in which the circuit constituents which are identical to those in FIG. 1 are shown by like numerals. It is different from FIG. 3 in that an additional equalizing circuit 23 in FIG. 5 functions so as to equalize the difference characteristic between equalizing characteristics of the equalizing circuits 2 and 22 in FIG. 3. This embodiment is advantageous for its simplicity of circuitry.

The necessary equalizing circuits can be designed by calculating the required frequency characteristics thereof from FIGS. 6(*a*) and (*b*) in the following manner. The over-all frequency characteristics of the equalizing circuit and the coaxial cable connected to the input side of the equalizing circuit, for 100 percent and *k* percent equalization, are illustrated by curves 1 and 2 in FIG. 6(*a*) respectively, in which the abscissa and the ordinate indicate frequency and normalized amplitude response, respectively. The curve 1 is characterized in that the amplitude response at $fo/2$ and $fo$ are nearly equal to 0.5 and zero. Also, the curve 2 is characterized in that the amplitude response of $fo/2k$ and $fo/k$ are nearly equal to 0.5 and zero. Those curves are easily obtained by applying the well-known Fourier transform to the waveforms in FIG. 2.

FIG. 6(*b*) shows the cable characteristic (by the dotted line) and the equalizer characteristics corresponding to the curves 1 and 2 in in FIG. 6(*a*). The cable characteristic is easily obtained as long as its length is given. Hence, the equalizer characteristic curves can be calculated by subtracting the cable characteristic from the curve 1 or 2 in FIG. 6(*a*). The results are shown in FIG. 6(*b*) by the solid lines. Those equalizer characteristics are obtained by the wellknown circuit designs such as the bridge T network, the ladder network and so on (see "Synthesis of Passive Network" by Ernest A. Guillemin; John Wiley & Sons Inc., 1957).

The above is the principle of this invention, and further explanation will be given next with refernce to FIG. 7, giving some concrete numerical data. FIG. 7 shows, by way of example, the change of the clock component extraction ratio for five-level code pulse train adopting five levels of 0, ±1 and ±2. The equalization degree $\alpha = T'/T$ being indicated on the abscissa and the clock frequency extraction ratio $\gamma$ on the ordinate. Curve (*i*) shows the extraction ratio for the code pulse train containing a single +1 (or −1) code in each nine digits, i.e., ±1, 0, 0, 0, 0, 0, 0, 0, 0; curve (*ii*) shows that for the code pulse train containing two successive +1 (or −1) codes in each nine digits, i.e., ±1, ±1, 0, 0, 0, 0, 0, 0, 0; and curve (*iii*) shows that for the code pulse train containing a sequence of +1 and +2 (or −1 and −2) codes in each nine digits, i.e., ±1, ±2, 0, 0, 0, 0, 0, 0, 0. These code patterns are of typical type in the code pulse train from which the clock s1gnal extraction is most difficult. The equalization degree $\alpha = 1.0$ means 100 percent equalization. As is seen from the curve (*ii*) and (*iii*) of FIG. 7, $\gamma$ approaches 0 as $\alpha$ approaches 1.0. In this case, extraction of the clock frequency component is impossible. It can also be seen that, for $\alpha$ smaller than P where curves (*i*) AND (*ii*) intersect each other, curve (*i*) gives the smallest extraction ratio except for the all-zero pattern. Needless to say, it is impossible to extract the clock component from the all-zero pattern, hence the necessity arises to prohibit the all-zero pattern in terminal apparatuses connected to the repeating system, as is also the case with a short distance PCM repeater system. Although extraction of the clock component is also possible even if $\alpha$ is larger than P and smaller than 1, it is not preferable, to adopt $\alpha$ larger than P since for such $\alpha$ the pattern corresponding to curve (*ii*) becomes the worst with respect to the timing extraction, and the extraction ratio becomes extremely bad.

Although FIG. 7 has been plotted for nine-digit patterns containing at least one non-zero code level, graphs of similar tendency is generally obtained for patterns of other length, giving the value of P nearly equal to 0.9 It is therefore appropriate to chose $\alpha<0.9$ for practical arrangements. It should also be noticed that, although not shown in FIG. 7, when the pattern is a repetition of (+2, −2) or a succession of either +2 or −2 the maximum extraction ratio is obtained, the value of which can easily be calculated. Thus the variation of the output of the tank circuit 8, or of the input of the limiting circuit 9, ranges for $\alpha<0.9$ between curve (*i*) of FIG. 7 and the maximum valve calculated above, from which the design criterion for the limiting circuit 9 can readily be established.

What is claimed is:

1. A pulse regenerative repeater for a multilevel pulse communication system employing multilevel code pulses comprising:

a first equalizing means for equalizing received code pulses, said first equalizing means producing only one isolated pulse with a half-level width narrower than 90 percent of the clock period of said received code pulses when an original isolated rectangular pulse having the pulse width equal to one-half of said clock period is applied to the input thereof;

means for folding the output of said first equalizing means on the amplitude axis;

a tank circuit for extracting the clock frequency component from the output of said folding means;

means for limiting the output of said tank circuit to a predetermined level to deliver a clock signal with a constant amplitude;

a second equalizing means for equalizing the received code pulses, said second equalizing means producing only one isolated pulse with a half-level width substantially equal to 100 percent of the clock period when said original isolated rectangular pulse is applied to the input thereof; and means for recognizing each level of the output of said second equalizing means by using said clock signal to deliver regenerated multilevel pulses.

2. In a pulse regenerative repeater for a multilevel pulse communication system utilizing multilevel code pulses, the combination comprising first equalizing means having a half-level equalization response of less than 100 percent;

means responsive to the output of said first equalizing means for extracting a clock signal from a series of multilevel code pulses;

second equalizing means receiving said multilevel code pulses and having a half-level equalization response of 100 percent; and recognition circuit means responsive to the extracted clock signal and the output of said second equalizing means for reproducing the received code pulses.

* * * * *

UNITED STATES PATENT OFFICE
CERTIFICATE OF CORRECTION

Patent No. 3,760,111 Dated September 18, 1973

Inventor(s) AKIRA SAWAI

It is certified that error appears in the above-identified patent and that said Letters Patent are hereby corrected as shown below:

IN THE SPECIFICATION:

Col. 3, line 6, delete "24" and insert therefor --2--.

line 44, delete "wellknown" and insert therefor --well-known--;

line 66, delete "slgnal" and insert therefor --signal--.

Col. 4, line 4, delete "AND" and insert therefor --and--.

Signed and sealed this 23rd day of April 1974.

(SEAL)
Attest:

EDWARD M.FLETCHER,JR.
Attesting Officer

C. MARSHALL DANN
Commissioner of Patents